March 4, 1924. Re. 15,784

G. A. HOUSEMAN

RADIATOR CORE

Original Filed May 24, 1921

Inventor
George A. Houseman
by Clarence E. Mehlhope
Atty.

Reissued Mar. 4, 1924. Re. 15,784

UNITED STATES PATENT OFFICE.

GEORGE A. HOUSEMAN, OF SHREVEPORT, LOUISIANA.

RADIATOR CORE.

Original No. 1,433,374, dated October 24, 1922, Serial No. 472,112, filed May 24, 1921. Application for reissue filed March 23, 1923. Serial No. 627,223.

*To all whom it may concern:*

Be it known that I, GEORGE A. HOUSEMAN, a citizen of the United States, and a resident of Shreveport, in the parish of Caddo and State of Louisiana, have invented certain new and useful Improvements in Radiator Cores; and I do hereby declare that the following is a full, clear, and exact description thereof, reference being had to the accompanying drawings, and to the letters of reference marked thereon, which form a part of this specification.

The device forming the subject matter of this application is adapted to be employed for cooling, heating or condensing, the structure being of peculiar utility when embodied in the form of a core for the radiator of an automobile.

The invention aims to provide a cellular radiator core, the constituent members of which may be made out of a continuous strip, tubes being formed, and each tube having an internal partition, a sinuous passage for the liquid being provided.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 3 is a side elevation, the line 2—2 in Figure 3 indicating the cutting plane on which Figure 2 is taken.

Figure 1:
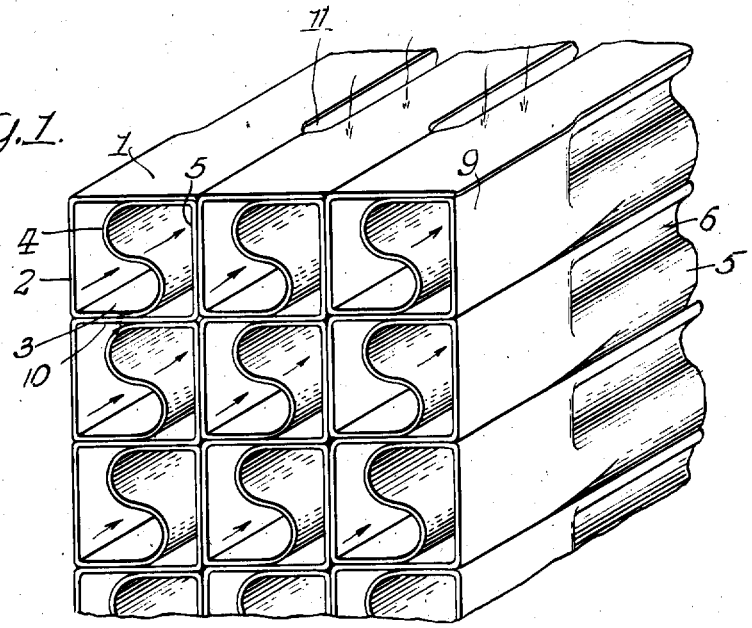
Figure 1 shows in perspective, a device constructed in accordance with the invention, parts being broken away.

In putting the present invention into practice, a strip of metal is provided, and the same is bent upon itself to form the outer wall of a tube, one side member of the tube being denoted by the numeral 1, the side member 1 being prolonged to form a side member 2, the side member 2 being extended to form a side member 3. The side member 3 is bent and extended to fashion an S-shaped partition 4 merging into a side member 5, which, in its turn, is continued to constitute a side member 10 overlapped upon the side member 3, the side member 3 being disposed opposite to the side member 1 and the side member 5 being disposed opposite to the side member 2, as shown clearly in Figure 1 of the drawings. The side member 10 of any one tube forms the member 1 of the tube next adjacent thereto, the construction being continued to any desired extent, so that each bank of tubes is formed from a single strip.

Figure 2:
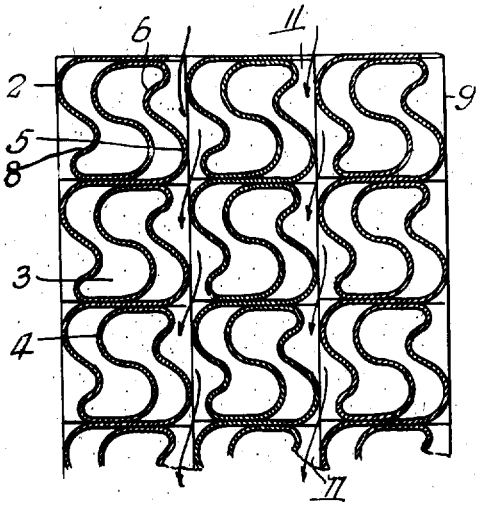
Figure 2 is a transverse section.
Figure 3:
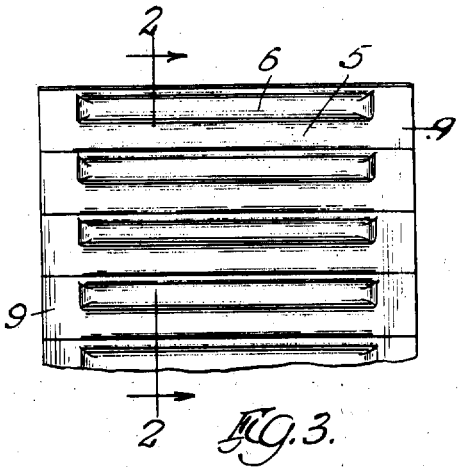

Referring to Figure 2 and comparing that figure with Figure 1, it will be noted that the vertical side member 5 is bulged inwardly to form a channel as indicated at 6, and the vertical side member 2 is bulged inwardly to provide a channel as indicated at 8. These inwardly bulged portions or channels 6 and 8 are not located opposite to each other, and, consequently, when one bank of tubes is placed against another bank, as shown in Figure 2, the inwardly bulged portion or channel 6 of each tube stands opposite to and complements the non-inwardly bulged portion or rib of the adjacent tube in the same horizontal row, so that there results, between each of the vertical banks or rows of the tubes, a sinuous passage 11 through which the liquid to be cooled passes. The inwardly bulged portions 6 and 8 do not extend to the ends of the tubes, the ends of the tubes being left plain, as shown at 9, so that when one vertical bank of tubes is placed against another bank in assembling the cellular radiator core, the liquid or water passage between said banks will be closed at its ends. Owing to the fact that the S-shaped partition or fin is provided, a maximum conducting surface is afforded, and the tube, at the same time, is reinforced and strengthened. The sinuous passage shown at 11 promotes the operation of the device, in that no eddies result; no large body of liquid remains stationary at any one place; and, since the water is forced to follow the sinuous path of said passage and has no direct, straight path therethrough, the flow of the stream through the sinuous passage brings substantially all the water or liquid into frequent and continuing contact with the metal walls of the passage, thus insuring a rapid temperature interchange and a quick loss of heat through the radiation of the metal of the core. In view of the fact that each bank of tubes is made of a single strip of metal, the bank may be of any desired extent, that is, there may be as many or as few tubes therein as the manufacturer may desire. After any desired number of banks of tubes have been assembled as shown in Figure 1, the same are immersel in a composition composed of soldering flux and hot solder, a thorough coating both inside and out being the result, and the constituent banks of tubes being held together securely. The device affords a large amount of heating surface with the expenditure of a minimum amount of material, and a repair of the structure may be brought about at any time without difficulty.

I claim as my invention:—

1. A radiator unit embodying a tube fashioned from a single strip bent upon itself to form, in a one piece structure, the outer wall of the tube and a partition connecting spaced portions of the tube and located within the tube, the partition being reversely curved to give the partition an S shape in cross section and to form longitudinal concavities in the partition, opposed portions of the wall of the tube being bulged inwardly, out of alinement with each other, in spaced relation to the ends of the tube and in alinement with the concavities of the partition, to form, in the completed radiator a sinuous water passage.

2. A cellular radiator core comprising a plurality of tubular members, said tubular members being substantially rectangular in cross section and being arranged in vertical and horizontal rows, the several tubular members having their opposed, vertical side walls intermediate their ends formed to provide longitudinally extending complemental ribs and channels whereby vertically disposed passageways are provided between adjacent vertical rows of tubular members, and each tubular member being provided intermediate said side walls with a longitudinally extending fin S-shaped in cross section connecting its top and bottom walls.

3. A cellular radiator core comprising a plurality of tubular members, said tubular members being substantially rectangular in cross section and being arranged in vertical and horizontal rows, the several tubular members having their opposed side walls intermediate their ends formed to provide complemental ribs and channels whereby vertically disposed passageways are provided intermediate said walls, and an intermediate, longitudinally extending fin S-shaped in cross section connecting the top and bottom walls of each tubular member, the several tubular members in each vertical row being fashioned from a single strip bent upon itself, to form in one piece the tubular structure including said fin.

In testimony that I claim the foregoing as my invention, I affix my signature in the presence of two witnesses, this 10th day of March, A. D. 1923.

GEORGE A. HOUSEMAN.

Witnesses:
H. M. SNIDER,
C. W. PASQUIER.